April 29, 1958     C. B. FITES     2,832,646
EMERGENCY RELAY VALVE FOR TRACTOR TRAILER BRAKE SYSTEM
Filed May 11, 1953     2 Sheets-Sheet 1
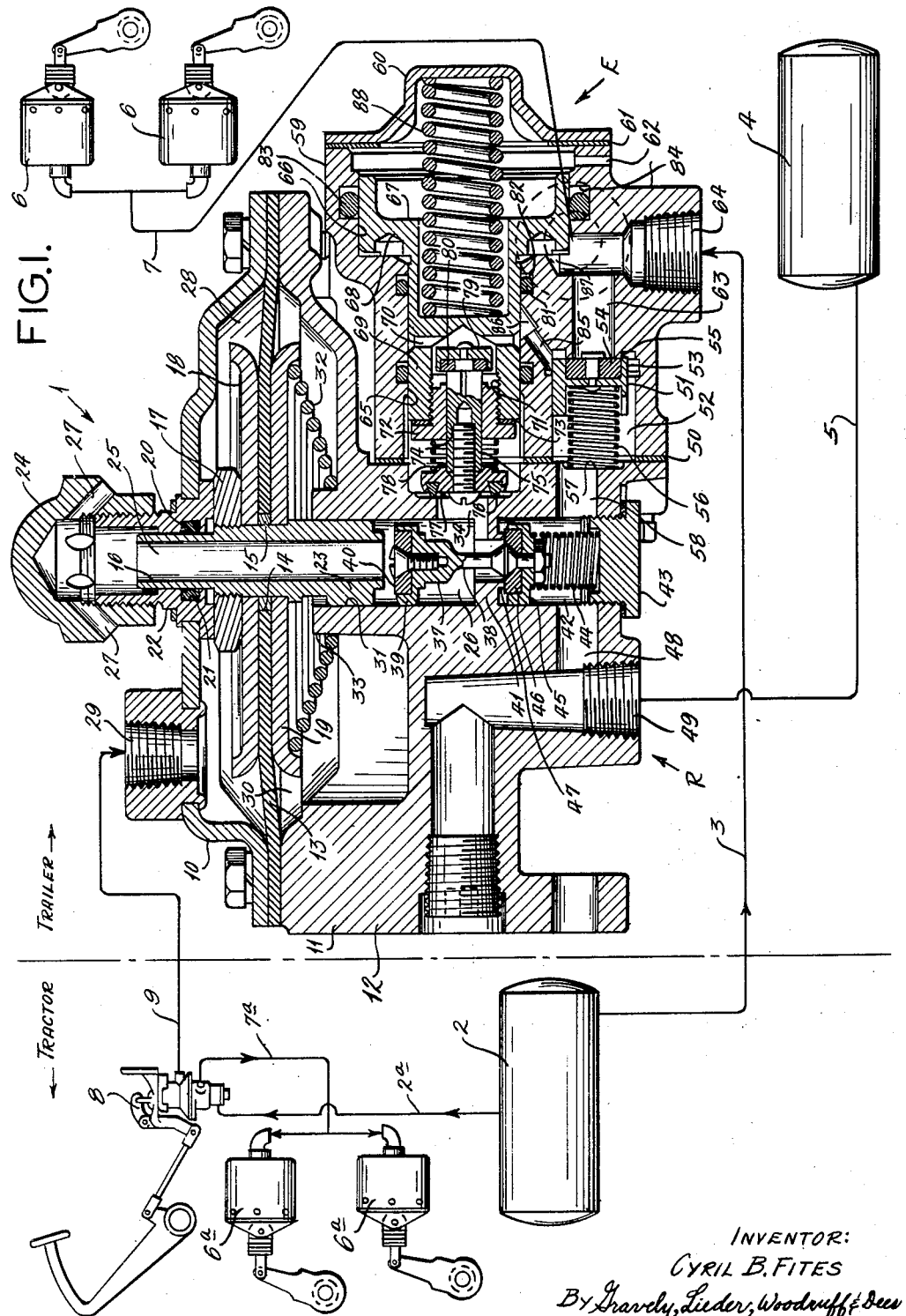
INVENTOR:
CYRIL B. FITES
By Gravely, Lieder, Woodruff & Dees
ATTORNEYS.

April 29, 1958 C. B. FITES 2,832,646
EMERGENCY RELAY VALVE FOR TRACTOR TRAILER BRAKE SYSTEM
Filed May 11, 1953 2 Sheets-Sheet 2
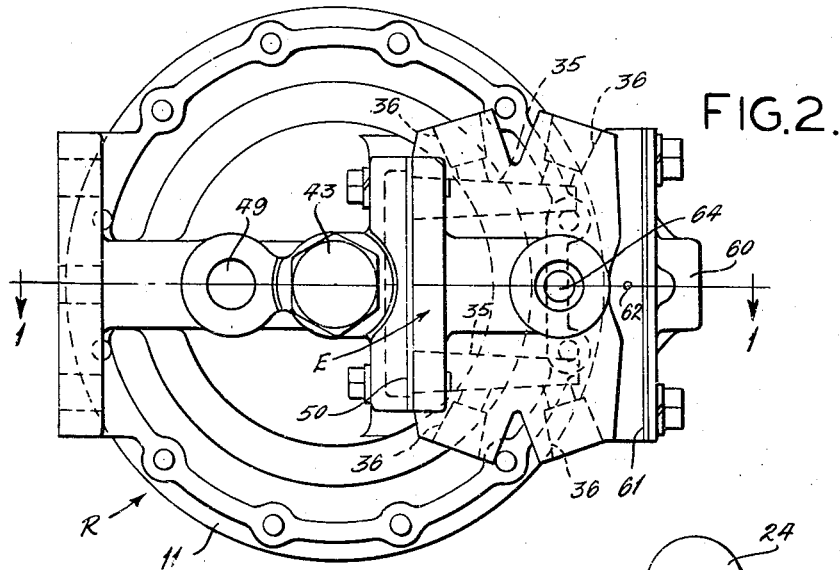
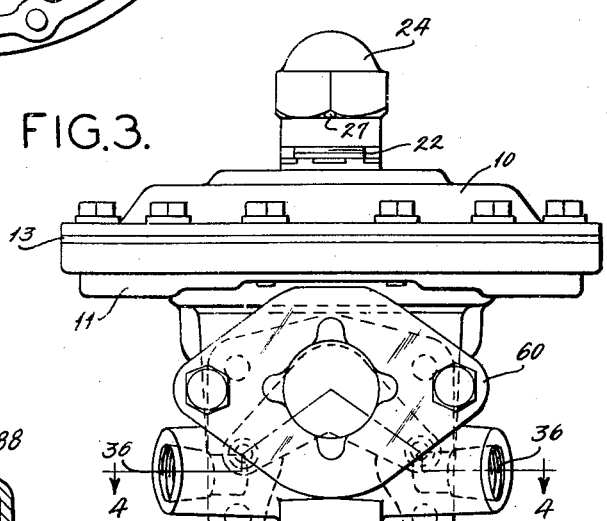
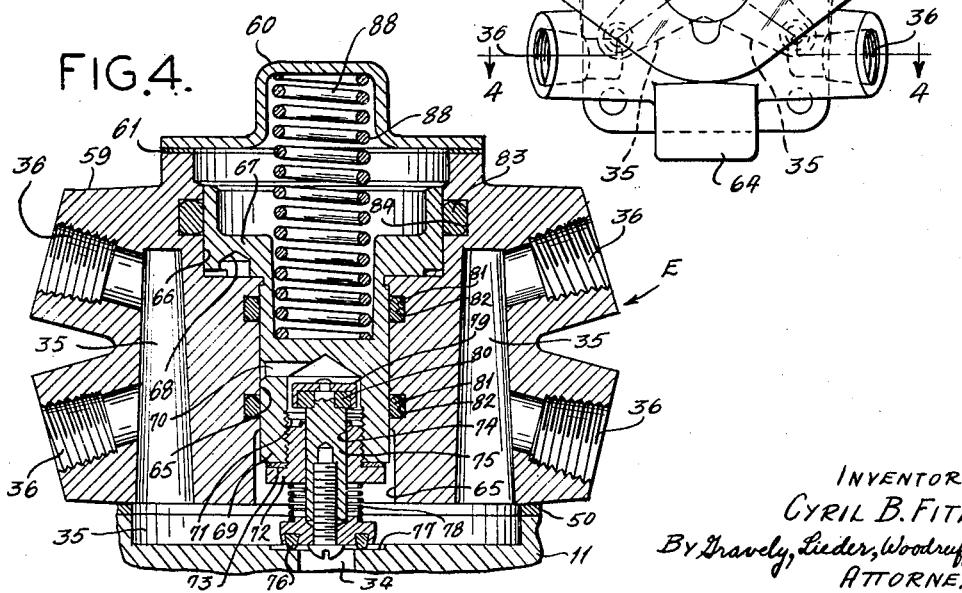
INVENTOR:
CYRIL B. FITES
By Gravely, Lieder, Woodruff & Deeg
ATTORNEYS.

United States Patent Office 2,832,646
Patented Apr. 29, 1958

2,832,646

EMERGENCY RELAY VALVE FOR TRACTOR TRAILER BRAKE SYSTEM

Cyril B. Fites, St. Johns, Mo., assignor to Wagner Electric Corporation, St. Louis, Mo., a corporation of Delaware Application May 11, 1953, Serial No. 354,317

3 Claims. (Cl. 303—26)

This invention relates to emergency relay valves of the kind used in fluid pressure brake systems for automotive vehicles for applying fluid pressure to a fluid operated brake cylinder located at a distance from a main source of fluid pressure, such as in the case of brakes on a trailer of a tractor-trailer combination or on the rear brakes of a truck with a long wheel base, so as to cause the remotely located brakes to operate in response to an operator's action as quickly as the front wheel brakes of the vehicle. In particular, this invention relates to emergency relay valves of the kind used in fluid brake systems for automotive vehicles for automatically applying the remotely located brakes when the pressure in the main reservoir of the system falls below a predetermined value for any reason.

This invention relating to emergency relay valves is used in combination with a fluid pressure braking system having a main reservoir, an auxiliary reservoir, brake operating cylinders, a brake application valve, and comprises a housing having a diaphragm in the relay portion thereof and a piston in the emergency portion thereof.

The present invention and application contain subject matter in common with my co-pending application Serial No. 125,331 filed November 3, 1949 entitled Relay Valve for Tractor Trailer Brake System, now Patent No. 2,656,014, and is also an improvement on the constructions forming the subject matter of the Fites and Ryan application Serial No. 150,176 filed March 17, 1950, now Patent No. 2,690,359.

One of the principal objects of the present invention is to provide an emergency relay valve which will, during a gradual loss of tractor tank pressure, meter pressure fluid through the emergency portion to the trailer brake operating cylinders in proportion to the drop in the tractor tank pressure, after the tractor tank pressure drops below a predetermined pressure, for example, about forty pounds per square inch.

Another object of this invention is to provide an emergency relay valve wherein the emergency portion will begin to operate automatically precisely when the tractor tank pressure drops below a predetermined value.

Still another object is to provide an emergency relay valve having the herein described features and which permits the operation of the emergency portion without disturbing or actuating the relay portion of said emergency relay valve, thereby allowing a weaker spring to be used in the emergency portion since the additional forces in the relay portion do not have to be overcome.

Another object of the present invention is to provide in a braking system, an emergency relay valve having fewer parts, a more simple construction, and a more practical embodiment in that it provides a more rapid and positive action than those valves heretofore used.

Another object of this invention is to meter the amount of fluid pressure applied to the remotely located brakes to the exact amount desired by the operator so that an operator can "feel" the application of said remotely located brakes and control said application in proportion to the application of his manual control means.

Still another object is to provide in an emergency relay valve, an emergency portion having no diaphragm therein but a piston which is easy to make and install and which provides a better practical construction.

This invention is embodied in an emergency relay valve mechanism comprising a housing having a resilient means therein, a normally open exhaust valve operatively connected to said resilient means, an exhaust valve head adapted for closing said exhaust valve, a valve stem secured to said exhaust valve head, said valve stem having a normally closed actuating valve secured thereto and adapted for opening after said exhaust valve has closed, and an independent emergency means comprising an emergency piston operatively connected to the brake operating cylinders for allowing pressure fluid to be supplied thereto, said emergency piston being responsive to pressure from the main reservoir for rendering said emergency means operative or inoperative.

The invention also consists in the parts and arrangements and in the combination of parts hereinafter described and claimed.

In the accompanying drawings, which form part of this specification and wherein like numerals and symbols refer to like parts wherever they occur:

Fig. 1 is a diagrammatic view of a fluid pressure brake system showing a longitudinal cross-sectional view of an emergency relay valve embodying the present invention, with the parts in the emergency portion in their emergency position, Fig. 2 is a bottom view of the new valve shown in Fig. 1, Fig. 3 is a side elevational view thereof, and Fig. 4 is a fragmentary cross-sectional view taken along the line 4—4 of Fig. 3.

Referring now to the drawings in detail, it will be seen that my emergency relay valve 1 is shown embodied in a brake system having a main or tractor reservoir 2 supplied with fluid under pressure from a source not shown and connected with said emergency relay valve 1 by an emergency line 3, an auxiliary or trailer reservoir 4 adapted for receiving pressure fluid from said main reservoir 2 and connected with the valve 1 by an auxiliary reservoir line 5, said valve 1 and auxiliary reservoir 4 being located near the rear brake operating cylinders 6 which receive pressure fluid from said auxiliary reservoir 4 through a brake operating cylinder line 7, and a brake application valve 8 connected with said main reservoir 2 by a line 2a, and said relay valve 1 by a brake application valve line 9. Front brake operating cylinders 6a are connected to the brake application valve 8 by means of a brake operating cylinder line 7a. The rear brake operating cylinders 6 are remotely located and may be on the trailer of a tractor-trailer combination or on the rear brakes of a truck having a long wheel base. The front brake operating cylinders 6a may be located on the front and/or rear brakes of a tractor in a tractor-trailer combination or on the front brakes of a truck having a long wheel base.

The valve 1 comprises a relay portion R and an emergency portion E. The relay portion R comprises an upper housing member 10 and a lower or left housing member 11 rigidly secured together to form a housing 12 for the relay mechanism. Secured in said housing 12 by its outer edge portion is a diaphragm 13 having a central opening 14 with a collar 15 therein for receiving an exhaust valve stem 16 rigidly mounted thereon by means of a lock nut 17 and a plate 18 cooperating with a stop plate 19 secured to said exhaust valve stem 16 on the opposite side of said diaphragm 13. Fitting circumferentially around the exhaust valve stem 16 is an O ring or seal 20 positioned in an annular groove 21 in a nipple 22 in the upper housing member 10. The exhaust valve stem 16 is provided with a relatively thin walled upper portion which extends into said nipple 22 which is provided with a cap 24. Said exhaust valve stem 16 is also provided with an exhaust valve stem passage 25 to connect a bore or valve chamber 26 with exhaust ports 27 in the cap 24. Thus, a means of exhausting pressure fluid from the brake operating cylinders 6 is provided. A cavity is provided in the upper housing member 10 which in conjunction with a diaphragm 13 forms an application or upper chamber 28. The application chamber 28 is connected to the brake application valve 8 by the brake application valve line 9 and an inlet passage 29.

The diaphragm 13 also forms a wall for a diaphragm chamber 30 partially formed by a cavity in the upper portion of the lower housing member 11. The guide bore 26 of the lower housing member 11 slidably receives the thickened end portion 23 of the exhaust valve stem 16, said end portion 23 and the wall of the lower housing member 11 forming said guide bore 26 having a clearance 31 therebetween. A diaphragm return spring 32 is positioned over said exhaust valve stem 16 and a collar 33 on said lower housing member 11 so as to rest upon said housing member 11 and abut against the stop plate 19. Located adjacent to the diaphragm chamber 30, and connected thereto by clearance 31, is the valve chamber 26 having a passage 34 connected thereto, said passage 34 being operatively connected to a pair of openings or L-shaped passageways 35 leading to the outlet ports 36 for connection with the brake operating cylinder line or lines 7. An exhaust valve 37 is located within said valve chamber 26. The exhaust valve 37 comprises a stem 38 having an exhaust valve head 39 thereon with a valve head insert 40 therein, said insert 40 being in axial alignment with the exhaust valve stem 16 to control the opening of the exhaust valve stem passage 25 therein.

A rib section 41 is provided in the lower housing member 11. The stem 38 is extended below said rib section 41 into an inlet chamber 42 formed by a closure cap 43 in the lower portion of the lower housing member 11. A spring 44 is mounted in said inlet chamber 42. Secured to the lower end of the said stem 38 is an actuating valve head 45 with a valve head insert 46 therein in abutting relation to a valve seat 47 located on said rib section 41 for controlling the opening formed adjacent to said rib section 41 between the valve chamber 26 and the inlet chamber 42. A passage 48 is connected to said inlet chamber 42. The passage 48 leads to an auxiliary reservoir port or inlet 49 in the lower housing member 11 and connects said inlet chamber 42 with the auxiliary reservoir line 5.

In the lower part of the emergency portion E, which is rigidly secured to the left housing member 11 with a gasket 50 therebetween, is a check valve 51 slidably mounted in a bore or chamber 52 for allowing the flow of pressure fluid in only one direction, said check valve 51 comprising a slidable check valve head 53 with a check valve insert 54 in abutting relation to a check valve seat 55 in said emergency portion E, and a check valve spring 56 positioned between said check valve head 53 and a portion 57 of the lower housing member 11. A duct 58 leads from said bore 52 to the inlet chamber 42. The emergency mechanism, including the check valve 51, is within a casing 59 having a cap 60 with a gasket 61 therebetween. A port 62 is provided in the casing 59.

A passage 63 extends to the right of the bore 52 with the communication therewtih being controlled by said check valve 51. Intersecting the right end of the passage 63 is an inlet port 64 to which is attached an emergency line 3 from the tractor tank 2. Located above the bore 52 and passage 63 is a cylindrical bore 65 and counterbore 66 which houses a double diametral piston 67 slidably mounted therein. Said piston 67 is provided with face 68 to be described later and an extended portion or stem 69 which is primarily housed in the bore 65 and is provided with a cross passage 70 therein. Intersecting the cross passage 70 and extending leftwardly therefrom is a bore 71 which threadedly receives a shuttle valve seat 72 with said valve seat 72 which is sealed in said bore 71 by virtue of a gasket 73. The valve seat 72 is, in turn, provided with a bore 74 for receiving an emergency shut-off valve 75 which has a square cross-section and which supports an insert 76 at its left end which is biased against a portion 77 of the lower housing member 11 by a valve spring 78.

Supported on the right end of the shut-off valve 75 is a shuttle valve 79 provided with an insert 80, said insert 80 being concentric with the bore 74 in the valve seat 72 to control the flow of pressure fluid between the flat surfaces on the shut-off valve 75 and the wall of the bore 74. O rings 81 are fitted in recesses 82 provided in the wall of the cylindrical bore 65 for sealing about the outer cylindrical surface of the extended portion 69 of the double diametral piston 67 and a larger O ring 83 is provided in a recess 84 in the counterbore 66 for sealing about the outer surface of the larger diametral end of said piston 67. The advantage of the O rings 81 is evident from the fact that the bore 52 in the lower portion of the emergency valve body E is connected to the cylindrical bore 65 by a passage 85 and a recess 86 provided in the wall of the said bore 65 with the O rings preventing the passage of pressure fluid to either side of the piston 67 except as is provided through the cross passage 70 in the piston 67 and bore 71 in communication therewith. A passage 87 is also provided in a lower portion of the emergency portion E to connect the passage 63 with the counterbore 66 in such a manner as to allow the incoming pressure to be effective upon the face 68 of the piston 67. The piston 67 is normally biased to the left by an emergency spring 88 which is supported at its left end by said piston 67 and at its right end by the emergency spring cap 60 secured to the emergency valve body E and sealed thereto by gasket 61 and cap screws. The port 62 is provided to maintain atmospheric conditions in the counterbore 66 to the right of the piston 67 at all times. The cylindrical bore 65 in the emergency portion E is provided with openings 35 which connect with the ports 36, as best shown in Fig. 4, said openings 35 intersecting the bore or chamber 65 to the left of the piston 67.

The emergency relay valve is normally used as a part of the trailer braking system. Attached to the ports 36 are the connecting conduits 7 leading to the power cylinders 6 which are responsible for the direct actuation of the trailer brake assemblies.

The operation of the relay portion R is as follows: As the operator of the vehicle upon which the subject air brake system is installed desires to make a braking application, the application valve 8 is manually actuated to meter pressure fluid from the tank or pressure reservoir 2 through the connecting conduit 9 and through the inlet passage 29 into the upper or application chamber 28. Thus the pressure fluid entering the upper chamber 28 is effective upon the upper side of the diaphragm 13 and will create a force thereon in proportion to the resulting fluid pressure to force said diaphragm 13 and parts attached thereto downward against the biasing action of the spring 32 housed in the diaphragm chamber 30. As the downward movement of the diaphragm 13 occurs the exhaust valve stem 16, which is secured thereto, makes contact with the insert 40 carried by the exhaust valve head 39 to close the lower end of the exhaust passage 25 in said exhaust valve stem 16. Subsequent downward movement, if sufficient to also overcome the light spring 44 acting on the actuating valve head 45, will remove the insert 46 carried thereby from its cooperating seat 47 to permit pressure fluid from the trailer tank or pressure reservoir 4 to flow through the connecting conduit 5 through the inlet 49 through the passage 48 into the inlet chamber 42.

The fluid pressure entering the chamber 42 is metered past the actuating valve head 45 into the valve chamber 26 and from the said chamber 26 flows rightwardly through the passage 34, past the shut-off valve 75, which is normally held in a rightward position (not shown) as will be later explained, and thence outwardly through the outlet ports 36 and then through the connecting conduits 7 to the power cylinders 6 for actuation of the rear brake assemblies.

It should be noted that a portion of the pressure fluid entering the valve chamber 26 will be permitted to flow through the clearance 31 between the lower end 23 of the exhaust valve stem 16 and the wall of the valve chamber 26 and pass into the diaphragm chamber 30 where said pressure fluid will be effective upon the lower surface of the diaphragm 13. The clearance 31 purposely restricts the flow of pressure fluid to the diaphragm chamber 30 to prevent a pressure build-up in said chamber 30 ahead of a pressure build-up in the power cylinders located near the subject emergency relay valve. Otherwise, due to the differences in the distance which the fluid pressure is required to flow, it is quite probable that the pressure build-up in the diaphragm chamber 30 ahead of that in the power cylinders would cause a fluttering action of the moving parts within the relay portion of the valve assembly.

The pressure fluid entering the diaphragm chamber 30 in the present instance creates a force on the lower surface of the diaphragm 13 which is substantially equal to the pressure acting on the upper surface of the said diaphragm 13 responsible for actuating the subject relay portion. Since the areas are substantially equal on both sides of the diaphragm the resulting forces will be substantially equal permitting the spring 32, assuming no further increase in the applying pressure on the upper side of the diaphragm 13, to move the diaphragm 13 and parts attached thereto upward sufficiently to permit the insert 46 carried by the actuating valve head 45 to be placed upon its cooperating seat 47 thus preventing further flow of pressure fluid thereby. At this stage the valve assembly is said to be in its "lapped" position.

In other words, the insert 40 on the exhaust valve head 39 is still in contact with the lower end of the exhaust valve stem 16 to prevent the exhaust of pressure fluid to atmosphere and the insert 46 remains in contact with the seat 47 to prevent a further increase of fluid pressure effective within the power cylinders on the trailer. The relay portion R will remain in the "lapped" position until the pressure fluid acting within the upper chamber 28 is either increased or decreased. If the operator increases the pressure fluid within the chamber 28 a force increase will cause the diaphragm 13 and parts attached thereto to move downward unseating the insert 46 from its cooperating seat 47 permitting a proportional increase in the fluid pressure acting within the power cylinder and as the pressure increase becomes substantially equal to that within the upper chamber 28, the increased pressure being effective in the diaphragm chamber 30 also after a slight delay, will again neutralize the forces acting on the diaphragm 13 permitting the spring 32 to return the movable parts to the "lapped" position.

When the operator wishes to release the brake assemblies, the application valve 8 is returned to its exhaust position to exhaust the pressure fluid in the upper chamber 28 of the relay portion R to the atmosphere by flowing back through the conduit 9 to the application valve 8. As the force on the upper surface of the diaphragm 13 is eliminated or decreased, the force on the lower surface of the diaphragm 13 resulting from the pressure existing within the diaphragm chamber 30 and the force of the spring 32 will move the diaphragm 13 and attached stem 16 upward to break the contact between the insert 40 of the exhaust valve head 39 and the lower end of the said stem 16 permitting pressure fluid within the power cylinders 6 to return through the connecting conduits 7, ports 36, passages 35, passage 34, valve chamber 26 and thence upward through the exhaust passage 25 in the exhaust stem 16 to atmosphere through the exhaust ports 27 in the cap 24. The valve will then remain in a position as shown until another application is made as described above.

The operation of the emergency portion E is as follows: When the emergency line 3 is connected to the inlet port 64 provided in the emergency valve body E fluid pressure from the tractor tank 2 will flow through the connecting emergency line 3 through the inlet port 64 into the passage 63 with the slightest pressure being capable of overcoming the weak check valve spring 56 to permit the pressure fluid to flow from the passage 63 into the passage or bore 52 and thence through the duct 58 in the lower housing 11 through the inlet chamber 42, and thence through the port 49 to the connecting conduit 5 leading to the trailer reservoir 4 where the pressure fluid is stored for subsequent use. It should be noted that as the pressure fluid enters the port 64 it contacts the face 68 of the piston 67 by virtue of the connecting passage 87 to permit said fluid pressure, if of or greater than a predetermined value, to overcome the force of the spring 88 to move said piston 67 rightwardly and to hold said piston 67 in its rightward position under normal operating conditions. As the piston 67 is moved to its rightwardly position, the shuttle valve 79 and insert 80 will remain stationary until the insert 80 makes contact with the right end of the valve seat 72 and in doing so, closes the right end of the bore 74 in the valve seat 72. Upon making contact between the insert 80 and the valve seat 72, the emergency shut-off valve 75 is carried rightwardly with further rightward movement of the large piston 67 breaking the contact between the insert 76 and the wall portion 77 of the lower housing 11, thus placing the valve chamber 26 in communication with the outlet ports 36. As indicated, under normal operating conditions the piston 67 is in a rightward position not shown herein.

It should also be noted that under normal conditions with the tractor tank 2 attached to the emergency relay valve, the parts will remain in the positions as discussed directly above and under such conditions a braking application may be made exactly as described in relation to the relay valve assembly with the one exception that the pressure fluid responsible for the actuation of the power cylinders connected to the valve body is taken from the trailer reservoir 4 instead of directly from the tractor tank 2 as is the case when the relay valve assembly is used without the emergency feature. Normally the relay portion R is only used by itself on a truck with a long wheel base and not on a trailer without having the emergency feature incorporated therein.

Realizing that the emergency portion of the emergency relay valve will have no effect upon the normal operating conditions, it will be assumed that the emergency line 3 has been ruptured to cause an emergency condition and which results in a sudden decrease of fluid pressure normally maintained in a tractor tank and/or in the said line 3 connecting the tractor tank with the emergency relay valve. When the line 3 is broken due to a break-away of the trailer from the tractor or due to some unforeseen circumstances, the fluid pressure acting on the face 68 of the piston 67 will also be exhausted to atmosphere by returning through the passage 87 and port 64 to the emergency line 3 and thence to the atmosphere through the ruptured portion of the said line. As the pressure on the face 68 drops below a predetermined value, the spring 88 will force the piston 67 leftwardly as the pressure drop occurs in the bore 66 effective on the face 68 with the insert 76 of the shut-off valve 75 first making contact with the wall portion 77 of the left housing 11 with subsequent leftward movement of the double diametral piston 67 overcoming the light forces of the valve spring 78 to move the shuttle valve seat 72 relative to the shut-off valve 75 and attached shuttle valve 79 to break the contact between the insert 80 of the valve 79 and the right end of the seat 72. Thus the pressure fluid in the auxiliary reservoir 4 is then permitted to return through the connecting conduit 5, the inlet 49 into the inlet chamber 42 and then flows rightwardly into the connecting passage 58 and then to the bore 52. From said bore 52 the pressure fluid will flow upward through passage 85 leading to the recess 86 with said recess placing the passage 85 in communication with the cross passage 70 in the piston 67. From the cross passage 70 the fluid pressure is then permitted to flow through the bore 71 past the shuttle valve 79 to flow between the wall of bore 74 in the shuttle valve seat 72 and the flat surfaces of the square shaped emergency shut-off valve 75 entering bore 65 of the emergency valve body E to the left of the extended portion 69 of the double diametral piston 67. From this portion of the bore 65, the pressure fluid from the trailer reservoir is permitted to flow outward through the ports 36 and connecting conduits 7 to the power cylinders 6 associated with the trailer brake assemblies to hold the said brake assemblies in their applied position until the ruptured emergency line 3 is repaired. Thus the movable parts in the emergency portion of the emergency relay valve will remain in the positions as shown until the tractor tank pressure is restored and again applied to the face 68 of the piston 67 to return it to its rightwardly position.

It should be noted that under emergency conditions the pressure fluid which passes the shuttle valve 79 is effective upon the left end of the valve seat 72 and the left end of the extended portion 69 which will assist the pressure fluid acting on the face 68 of the piston 67 to oppose the leftward biasing action of the emergency spring 88.

The emergency mechanism also works when there is a gradual decrease in pressure or a slow leak in the emergency line 3. Under such conditions, the emergency mechanism operates in the same manner as when there is a rupture in the emergency line 3 except that there is a gradual application. This gradual application is unlike that in prior devices wherein if there is a gradual loss of pressure, the loss continues until a certain predetermined value is reached at which time there is a sudden and immediate full emergency application of the brakes. If a slow leak occurs in a brake system having the present emergency relay valve therein, there is a gradual decrease in the force exerted against the face 68 of the piston 67. However, when the force of the emergency spring 88 is sufficient to slightly overcome the resistance against the face 68 of the piston 67 thereby unseating the insert 80 of the shuttle valve 79 from the valve seat 72, pressure fluid passes said shuttle valve 79 and enters the passages 35 leading to the ports 36. As the pressure fluid enters the passages 35 it also exerts a force or fluid pressure against the left end of the shuttle valve 79 and the left end of the extension 69 thereby assisting the pressure fluid acting against the face 68 of the piston 67 to move said piston 67 rightwardly sligthly until there is a still further gradual loss of pressure in the line. Thus there is a gradual application of the trailer brakes 6 when there is a gradual leak in the emergency line 3. The emergency portion E of the present invention meters the pressure fluid under emergency and does not allow an immediate and sudden application of the trailer brakes when there is only a gradual leak.

It is also to be noted that the present construction is such that under emergency conditions the pressure fluid from the trailer tank 4 has a free passage to the brake operating cylinders 6 and does not have to be of a sufficient predetermined amount to first unseat a valve, move a diaphragm or piston or the like in order to open a passage from the trailer tank 4 to the brake operating cylinders.

Under normal operating conditions, the pressure in the main reservoir 2 is directed against the piston 67 forcing it rightwardly thereby compressing the emergency spring 88 and closing the shuttle valve 79. A drop in pressure in the main reservoir 2 allows the spring 88 to move the piston leftwardly thereby unseating the shuttle valve 79 and allowing pressure fluid to flow from the auxiliary reservoir 4 to the brake operating cylinders 6 without actuating the relay valve portion R. Under emergency conditions, the emergency portion E does not actuate or operate the relay valve R.

What I claim is:

1. An emergency relay valve comprising a casing having an inlet passage adapted to be operatively connected to an application valve, an auxiliary reservoir port adapted to be operatively connected to an auxiliary reservoir, an emergency line inlet port adapted to be operatively connected to a main reservoir, an exhaust port, and an outlet port adapted to be operatively connected to brake operating cylinders, said emergency relay valve having an emergency portion and a relay portion, said emergency portion comprising a bore and a counterbore, a slidably mounted double diametered piston adapted to move under emergency conditions, said piston having its larger diametered portion in said counterbore and its smaller diametered portion in said bore, said larger diametered portion being subject at all times to the pressure of the main reservoir and to an opposing biasing action of a spring, said smaller diametered portion having a passage therein operatively connected to said auxiliary reservoir at all times, said smaller diametered portion having a valve therein for connecting said passage with said outlet port, a shut-off valve connected with said valve and adapted to close a passageway between said outlet port and a valve chamber in the relay portion under emergency conditions, said valve in said smaller diametered portion being closed under normal operating conditions and opened by movement of said piston after said shut-off valve is closed under emergency conditions.

2. An emergency relay valve comprising a casing having an inlet passage, an auxiliary reservoir port adapted to be operatively connected to an auxiliary reservoir, an emergency line inlet port adapted to be operatively connected to a main reservoir, an exhaust port, and an outlet port adapted to be operatively connected to brake operating cylinders, said emergency relay valve having an emergency portion and a relay portion, said emergency portion comprising a bore and a counterbore, a slidably mounted double diametered piston adapted to move under emergency conditions, said piston having its larger diametered portion in said counterbore and its smaller diametered portion in said bore, said piston being subject to the pressure of the main reservoir and to an opposing biasing action of a spring, said smaller diametered portion having a passage therein operatively connected to said auxiliary reservoir, said smaller diametered portion having a shuttle valve connected thereto, a shut-off valve connected to said shuttle valve, said shut-off valve being adapted to close a passage between said outlet port and a valve chamber in the relay portion, said shut-off valve being open and said shuttle valve being closed under normal operating conditions, said shuttle valve being under emergency conditions thereby establishing a connection between the outlet port and the auxiliary reservoir, said shut-off valve being closed under emergency conditions thereby closing the connection between said outlet port and a valve chamber and exhaust port in said relay portion, and a check valve allowing pressure fluid to flow from said main reservoir to said auxiliary reservoir but not in a reverse direction.

3. An emergency relay valve comprising a casing having an inlet passage adapted to be operatively connected to an application valve, an auxiliary reservoir port adapted to be operatively connected to an auxiliary reservoir, an emergency line inlet port adapted to be operatively connected to a main reservoir, an exhaust port, and an outlet port adapted to be operatively connected to brake operating cylinders, said emergency relay valve having an emergency portion and a relay portion, said relay portion having a valve chamber therein operatively connected to said outlet port under normal conditions, said emergency portion having a bore and a counterbore opposite said valve chamber, said emergency portion having a passageway operatively connected to said auxiliary reservoir, a double diametered piston in said bore and said counterbore adapted to move under emergency conditions, said piston having its larger diametered portion in said counterbore, said larger diametered portion being subject to the pressure in the main reservoir and to an opposing biasing action of a spring positioned within a chamber vented to the atmosphere, said piston having its smaller diametered portion in said bore, said smaller diametered portion having a cross passage therein operatively connected to said passageway and subject to the pressure in said auxiliary reservoir, a normally closed shuttle valve connected to said piston and adapted to close a passageway between said cross passage and said outlet port, a normally open shut-off valve connected to said shuttle valve and adapted to be closed by movement of said piston, said shut-off valve closing the connection between said valve chamber and said outlet port, said shuttle valve adapted to be opened by continued movement of said piston after said shut-off valve has been closed, whereby under emergency conditions pressure fluid flows from the auxiliary reservoir through the passageway, the cross passage, past the shuttle valve to the outlet port and brake operating cylinders.

References Cited in the file of this patent

UNITED STATES PATENTS

| | | |
|---|---|---|
| 1,765,634 | Stewart | June 24, 1930 |
| 2,018,212 | Johnson | Oct. 22, 1935 |
| 2,289,559 | Turek | July 14, 1942 |
| 2,441,050 | Wiegers | May 4, 1948 |